(12) United States Patent
Jeon et al.

(10) Patent No.: US 10,075,959 B2
(45) Date of Patent: Sep. 11, 2018

(54) METHOD AND APPARATUS FOR CONTROLLING UPLINK COVERAGE IN WIRELESS COMMUNICATION SYSTEM

(71) Applicant: Samsung Electronics Co., Ltd., Suwon-si, Gyeonggi-do (KR)

(72) Inventors: Joseph Jeon, Seongnam-si (KR); Yongsang Kim, Seoul (KR); Seungjoo Maeng, Seongnam-si (KR); Dongwook Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 15/069,267

(22) Filed: Mar. 14, 2016

(65) Prior Publication Data

US 2016/0270081 A1    Sep. 15, 2016

Related U.S. Application Data

(60) Provisional application No. 62/131,946, filed on Mar. 12, 2015.

(30) Foreign Application Priority Data

Mar. 31, 2015   (KR) .................. 10-2015-0045712
Apr. 22, 2015   (KR) .................. 10-2015-0056802

(51) Int. Cl.
*H04W 4/00*    (2018.01)
*H04W 72/08*   (2009.01)
*H04W 72/04*   (2009.01)

(52) U.S. Cl.
CPC ........ *H04W 72/08* (2013.01); *H04W 72/0446* (2013.01)

(58) Field of Classification Search
CPC ...................................................... H04W 72/08
See application file for complete search history.

(56) References Cited

U.S. PATENT DOCUMENTS

| | | | |
|---|---|---|---|
| 5,642,355 A | 6/1997 | Smith | |
| 8,559,417 B2 | 10/2013 | Yun et al. | |
| 2009/0141670 A1* | 6/2009 | Duncan Ho | H04W 28/06 370/328 |
| 2013/0242720 A1 | 9/2013 | Chou | |

(Continued)

FOREIGN PATENT DOCUMENTS

| | | |
|---|---|---|
| EP | 0 852 854 B1 | 1/2001 |
| EP | 2 816 832 A1 | 12/2014 |

(Continued)

OTHER PUBLICATIONS

Interdigital Communications, System-level design considerations for improved LTE UL VoIP coverage, 3GPP Draft; R1-122567, 3rd Generation Partnership Project (3GPP), May 21-25, 2012, vol. RAN WGI, Prague, Czech Republic; XP050600754, R1-122567.

*Primary Examiner* — Kevin C Harper
(74) *Attorney, Agent, or Firm* — Jefferson IP Law, LLP

(57) ABSTRACT

A method and an apparatus for controlling coverage of a base station in a wireless communication system are provided. The method includes determining a coverage control target terminal among terminals within a service radius of the base station and increasing a coverage of the coverage control target terminal.

18 Claims, 9 Drawing Sheets

(56) References Cited

U.S. PATENT DOCUMENTS

| | | | |
|---|---|---|---|
| 2013/0279480 A1* | 10/2013 | Park | H04L 1/1861 370/335 |
| 2013/0294379 A1* | 11/2013 | Guo | H04W 80/02 370/329 |
| 2014/0362832 A1* | 12/2014 | Rudolf | H04L 1/1822 370/336 |
| 2015/0031369 A1 | 1/2015 | Gunnarsson et al. | |
| 2015/0126238 A1 | 5/2015 | Simonsson et al. | |

FOREIGN PATENT DOCUMENTS

| | | |
|---|---|---|
| WO | 2013/138779 A1 | 9/2013 |
| WO | 2013/169152 A1 | 11/2013 |

* cited by examiner

METHOD AND APPARATUS FOR CONTROLLING UPLINK COVERAGE IN WIRELESS COMMUNICATION SYSTEM

CROSS-REFERENCE TO RELATED APPLICATION(S)

This application claims the benefit under 35 U.S.C. § 119(e) of a U.S. Provisional application filed on Mar. 12, 2015 in the U.S. Patent and Trademark Office and assigned Ser. No. 62/131,946, and under 35 U.S.C. § 119(a) of a Korean patent application filed on Mar. 31, 2015 in the Korean Intellectual Property Office and assigned Ser. No. 10-2015-0045712, and of a Korean patent application filed on Apr. 22, 2015 in the Korean Intellectual Property Office and assigned Serial No. 10-2015-0056802, the entire disclosure of each of which is hereby incorporated by reference.

TECHNICAL FIELD

The present disclosure relates to a wireless communication system. More particularly, the present disclosure relates to a method and an apparatus for controlling an uplink coverage in a wireless communication system.

BACKGROUND

Generally, mobile communication systems have been developed to provide a voice service while securing an activity of a user. However, mobile communication systems have gradually been extended from a simple voice service to a data service. At present, mobile communication systems have been developed to provide a high-speed data service. However, since a resource shortage phenomenon may occur in an existing mobile communication system that provides high-speed services, a more developed mobile communication system has been required.

To meet the requirement, standardization of the long term evolution (LTE) system in the 3rd generation partnership project (3GPP) is being developed as a next-generation mobile communication system. The LTE is a technology of implementing fast packet based communication having a maximum transmission rate of 100 Mbps or so. For this purpose, several schemes have been discussed. For example, a scheme of reducing the number of nodes located on a communication path by simplifying network architecture, a scheme of approaching radio protocols to a radio channel, etc.

Meanwhile, one of the LTE/LTE-advanced (LTE-A) technologies based on a packet switched scheme, a voice over LTE (VoLTE) may implement voice communication like the existing 3rd wireless communication based on a circuit switched scheme.

Unlike a voice over Internet protocol (VoIP) that may be used in a mobile messenger application, the VoLTE allows telecommunication companies (or common carriers) to control a transmission rate depending on a network state and perform management to prevent communication from being disconnected. By doing so, the VoLTE may have a faster connection rate and a higher quality of communication than the circuit switched scheme.

However, the VoLTE has the problem of the low data rate used in the existing 3rd wireless communication and a signal arrival coverage smaller than that of the voice communication dedicated standard based on the circuit switched scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for controlling an uplink coverage in a wireless communication system.

Another aspect of the present disclosure is to provide a method and an apparatus for determining, by a base station, terminals of which the coverage needs to be increased and applying a scheme of improving an increase in coverage to the determined user terminals.

In accordance with an aspect of the present disclosure, a method for controlling coverage of a base station in a wireless communication system is provided. The method includes determining a coverage control target terminal among terminals within a service radius of the base station and increasing a coverage of the coverage control target terminal.

In accordance with another aspect of the present disclosure, a base station for controlling coverage in a wireless communication system is provided. The base station includes a transceiver configured to transmit and receive a signal to and from a terminal and a controller configured to determine a coverage control target terminal among terminals in a service radius of the base station and increase a coverage of the coverage control target terminal to be increased.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
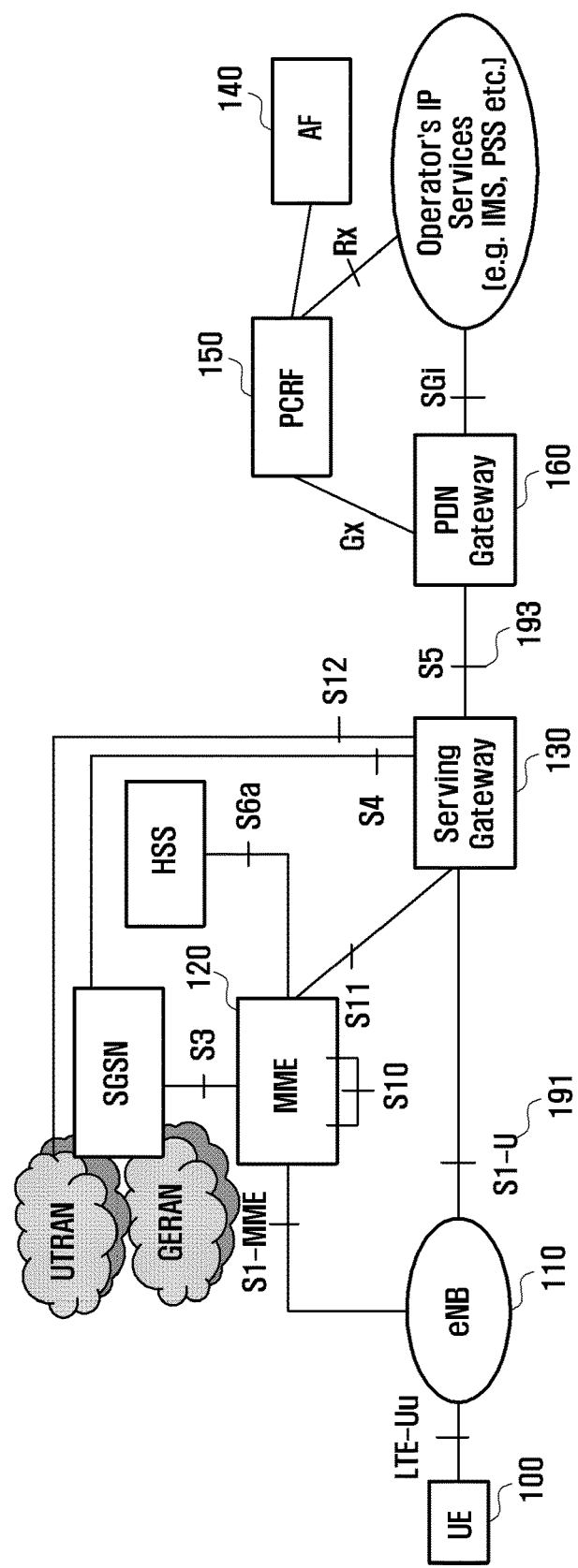
FIG. 1 is a diagram illustrating a structure of a long term evolution (LTE) mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the present disclosure, a description of technical contents which are well known in the art to which the present disclosure belongs and are not directly connected with the present disclosure will be omitted. This is to more clearly transmit the gist of the present specification by omitting any unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Further, it may be understood that each block of flowcharts and combinations of flowcharts may be performed by computer program instructions. Since these computer program instructions may be included in a processor of a general computer, a special computer, or other programmable data processing apparatuses, these computer program instructions executed through the process of the computer or the other programmable data processing apparatuses create means performing functions described in each block of the flowchart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in each block of the flow chart. Since the computer program instructions may also be mounted on the computer or the other programmable data processing apparatuses, the instructions performing a series of operations on the computer or the other programmable data processing apparatuses to create processes executed by the computer, thereby executing the computer or the other programmable data processing apparatuses may also provide operations for performing the functions described in each block of the flow chart.

In addition, each block may indicate any of modules, segments, or codes including one or more executable instruction for executing a specific logical function (specific logical functions). Further, it is to be noted that functions mentioned in the blocks occur regardless of a sequence in some alternative embodiments. For example, two blocks that are continuously shown may be simultaneously performed in fact or be performed in a reverse sequence depending on corresponding functions sometimes.

Here, the term '-unit' as used in the present disclosure means software or hardware components such as a field-programmable gate array (FPGA) and an application-specific integrated circuit (ASIC) and the '~unit' may perform any role. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more CPUs within a device or a security multimedia card.

An embodiment of the present disclosure described below relates methods for supporting seamless voice over long term evolution (VoLTE) communication between a base station and a terminal.

Further, embodiments of the present disclosure to be described below relate to methods for determining, by a base station, a terminal of which the coverage needs to be increased, applying a scheme for increasing coverage, and releasing the application of the scheme for increasing coverage to a terminal of which the coverage need not be increased.

A coverage of an uplink from a terminal to a base station is smaller than that of a downlink from the base station to the terminal Therefore, there is a need to increase an uplink coverage.

To increase the uplink coverage, an embodiment of the present disclosure proposes methods such as a transmission time interval (TTI) bundling method, a radio link control (RLC) segmentation method, a method for increasing a hybrid automatic repeat request (HARQ) maximum retransmission frequency, a frequency hopping method, a method for performing hopping in a bundling unit upon HARQ retransmission, a smart uplink (UL) (also referred to as 'UL resource coordination') using a resource coordinator, etc.

The TTI bundling method is to reduce a standby time caused by an increase in HARQ retransmission frequency of terminals at a coverage edge.

The RLC segmentation method is a method for segmenting a packet into several packets in the RLC of the LTE standard to reduce a packet size transmitted at a time at a medium access control (MAC) layer and transmit the packets several times. The RLC segmentation method may lower the number of resource blocks (RBs) and a modulation and coding scheme (MCS) during a preset time interval (for example, TTI) and may thus lower a block error rate (BLER), thereby increasing reliability of transmission.

The method for increasing an HARQ maximum retransmission frequency is a method for additionally transmitting data that have different redundancy versions in a base station but include the same information to increase a decoding success probability of a terminal.

The frequency hopping method is a method for using different frequency bands at each transmission timing upon HARQ retransmission to obtain frequency diversity.

The hopping in a bundling unit upon the HARQ transmission is a method for using different frequency bands in a bundle unit at each transmission timing upon the HARQ retransmission in a case of using the TTI bundling to obtain a frequency diversity gain.

The smart UL (UL resource coordination) scheme using the resource coordinator is a method for using a resource coordinator to collect information on base stations and controlling each base station based on the collected information to allocate an RB to a VoLTE terminal so that inter-cell interference is reduced.

FIG. 1 is a diagram illustrating a structure of an LTE mobile communication system according to an embodiment of the present disclosure.

Referring to FIG. 1, a radio access network of an LTE mobile communication system includes a next-generation base station (evolved node B (ENB), evolved universal mobile telecommunications system terrestrial radio access network (EUTRAN) (hereinafter, ENB, node B)) 110, a mobility management entity (MME) 120, and a serving-gateway (S-GW) 130. A user terminal (hereinafter, referred to as user equipment (UE)) 100 is connected to an external network through the ENB, the S-GW, and the packet data network (PDN)-gateway (P-GW).

The ENB (base station) 110 is an RAN node and corresponds to a radio network controller (RNC) of a UTRAN system and a base station controller (BSC) of a global system for mobile communications (GSM) edge RAN (GERAN) system. The ENB 110 is connected to the UE by a radio channel and performs a similar role to the existing RNC/BSC. The ENB may simultaneously use several cells.

The LTE serves real-time services like voice over Internet protocol (VoIP) through an internet protocol and all user traffic through a shared channel, and therefore requires an apparatus for collecting state information of UEs and scheduling the UEs, in which the ENB is in charge of the apparatus.

The MME 120 is an apparatus for taking charge of various control functions, in which one MME may be connected to a plurality of base stations.

The S-GW 130 is an apparatus for providing a data bearer and generates or removes the data bearer according to a control of the MME 120.

An application function (AF) 140 is an apparatus for exchanging information associated with applications at an application level.

A policy charging and rules function (PCRF) 150 is an apparatus for controlling a policy associated with a quality of service (QoS) of a user and transfers and applies a policy and charging control (PCC) rule corresponding to a policy to the P-GW 160. The PCRF 150 is an entity for collectively controlling the QoS for traffic and billing Generally, the UP refers to paths through which user data are transmitted and received to and from the UE 100 and the RAN node 110, the RAN node 110 is connected the S-GW 130, and the S-GW 130 is connected to the P-GW 160. By the way, among the paths, a portion using a radio channel in which a resource restriction is most severe is the path between the UE 100 and the RAN node 110.

In a wireless communication system like the LTE, a unit in which the QoS may be applied is an evolved packet system (EPS) bearer. One EPS bearer is used to transmit IP flows having the same QoS requirements. Parameters associated with the QoS may be designated in the EPS bearer. An example of the parameters may include a QoS class identifier (QCI) and allocation and retention priority (ARP). The QCI is a parameter in which the QoS priority is defined as an integer value and the ARP is a parameter determining whether to permit or reject the generation of the EPS bearer.

The EPS bearer corresponds to a packet data protocol (PDP) context of the general packet radio service (GPRS) system. One EPS bearer belongs to a PDN connection which may have an access point name (APN) as an attribute. If the PDN connection for IP multimedia subsystem (IMS) services like the VoLTE is generated, the corresponding PDN connection needs to be generated using the well-known IMS APN.

Meanwhile, the LTE network may use the IMS based VoLTE technology as a packet switched scheme for voice communication or may use a circuit switched fall back (CSFB) technology reusing a circuit switched scheme of the 2nd generation (2G)/3rd generation (3G) system. In the LTE network, the VoLTE may be used as the same concept as voice over IMS (VoIMS).

Figure 2:
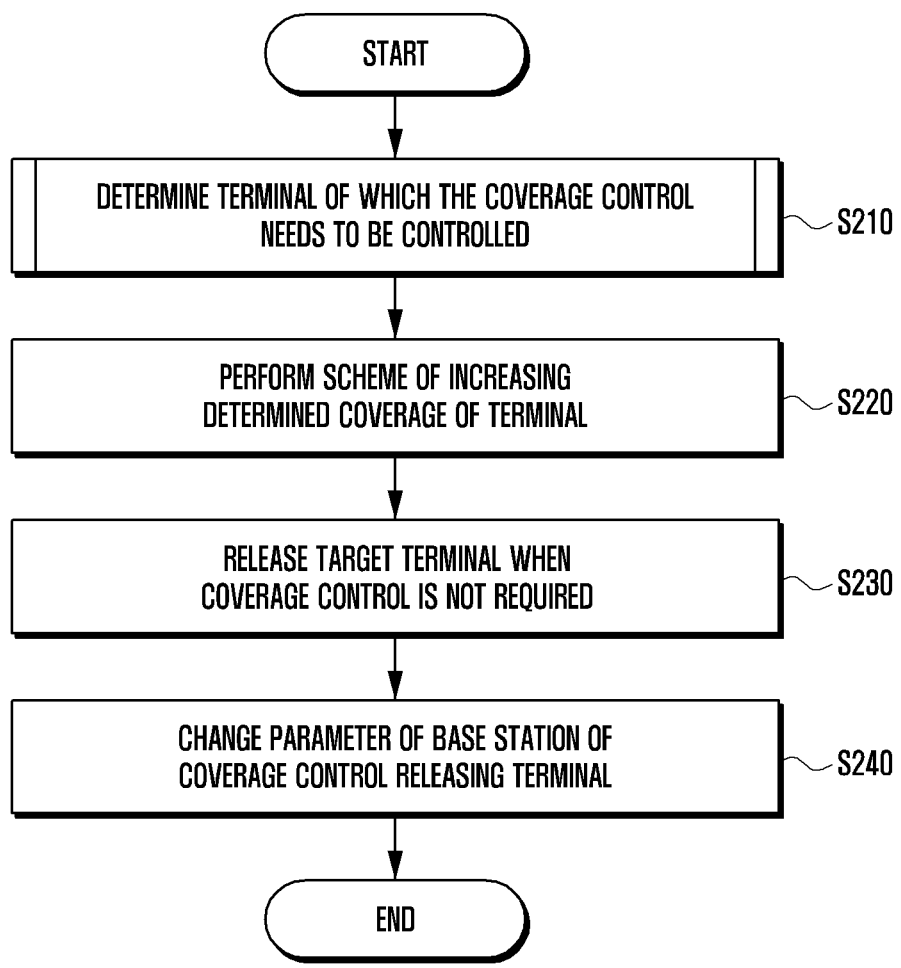
FIG. 2 is a flowchart illustrating a process of determining, by a base station, a terminal of which the coverage needs to be increased and applying a scheme of increasing coverage to the determined terminal according to an embodiment of the present disclosure.

FIG. 2 is a flowchart illustrating a process of determining, by a base station, a terminal of which the coverage needs to be increased and applying a scheme of increasing coverage to the determined terminal according to an embodiment of the present disclosure.

Briefly, operations of determining, by the base station, the terminal of which the coverage needs to be controlled among the terminals present at various locations within a cell, applying the scheme of increasing coverage to the determined terminal, releasing the application of the scheme for increasing coverage to the terminal not requiring the scheme for increasing coverage, and resetting, by the base station, parameters of the terminal to which the scheme of increasing coverage is not applied as a normal operation value will be described with reference to FIG. 2.

According to an embodiment of the present disclosure, the coverage control may include a series of operations for increasing coverage.

Further, according to an embodiment of the present disclosure, the coverage controlled to be increased may include the uplink coverage.

Hereinafter, the processes of FIG. 2 performed by the base station will be described.

Referring to FIG. 2, the base station determines the terminal of which the coverage needs to be controlled in operation S210. The conditions of determining, by the base station, the terminal of which the coverage needs to be controlled will be described below.

The base station may determine the terminal in which the radio bearer (logical data transmission path) for VoLTE transmission is set based on the standard. That is, the logical procedure for the VoLTE transmission needs to be set in the terminal of which the coverage needs to be controlled according to the embodiment of the present disclosure.

For example, in the radio bearer for the VoLTE, the QCI that is one of the factors of determining characteristics of the radio bearer may be set to be 1 or 5. As a result, if the base station confirms the QCI of the radio bearer for the terminal, the base station may confirm whether the radio bearer for the VoLTE transmission to the terminal is set.

The base station may determine a terminal in which a transport block size (TBS) transmittable to the uplink by a terminal is smaller than a preset first reference value $TBS\_{setupthreshold}$ as the terminal that has to suffer from the coverage control, among the terminals determined by the foregoing processes, in which the terminal may transmit the TBS to the uplink. This may be represented by the following Equation 1.

$$TBSi<TBS_{setupthreshold} \qquad \text{Equation 1}$$

In the above Equation 1, the TBSi may be a TBS transmittable to the uplink by a terminal i.

Alternatively, the base station may determine a terminal in which reference signal received intensity (RSRP) for a serving cell included in a measurement report message received from the terminal is smaller than a preset second reference value $RSRP\_{setupthreshold}$ as the terminal that requires coverage control, among the terminals in which the radio bearer for VoLTE transmission is set. This will be represented by the following Equation 2.

$$RSRPi<RSRP_{setupthreshold} \qquad \text{Equation 2}$$

In the above Equation 2, the RSRPi is an RSRP received by the terminal i from the serving cell.

The base station may determine the terminal satisfying at least one of the above Equations 1 and 2 as the terminal for increasing coverage, among the terminals in which the radio bearer for VoLTE is set.

In operation S220, the base station may apply the scheme of increasing coverage according to an embodiment of the present disclosure to the terminals set for the coverage control. As the method for increasing an uplink coverage according to an embodiment of the present disclosure, the RLC segmentation method, the method for increasing HARQ maximum retransmission frequency, the frequency hopping method, the TTI bundling method, the method for performing hopping in a bundle unit upon HARQ retransmission, and the method for using a multi-cell coordinator for an uplink resource has been proposed.

The methods may be used alone or a combination of at least two methods may be applied.

As a first method for increasing coverage, the RLC segmentation method will be described.

The base station may control the terminal to segment the VoLTE packet generated at the RLC layer of the LTE standard into a plurality of MAC packets. The base station may control the RLC segmentation of the terminal based on a control message transmitted to the terminal, for example, a downlink control information (DCI) message. In more detail, the base station may designate the MCS and the number of RBs in the DCI format 0 to control the RLC segmentation of the terminal.

In this case, as the base station controls the terminal to segment the VoLTE packet into a large number of MAC packets, the terminal may reduce the packet size transmitted at a time at a physical layer PHY. As a result, the terminal transmits the same size of original packet several times. To meet the packet size reduced by the foregoing processes, the number of RBs for uplink transmission and the MCS may be determined to be reduced.

The foregoing matters will be described with reference to FIGS. 6A and 6B.

Figure 6A:
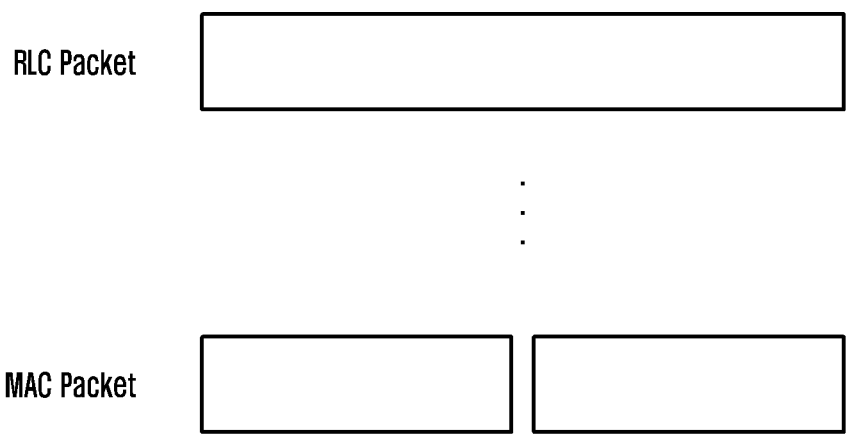
FIGS. 6A and 6B are diagrams illustrating a method for segmenting, by a terminal, a radio link control (RLC) packet into a medium access control (MAC) packet according to various embodiments of the present disclosure.
Figure 6B:
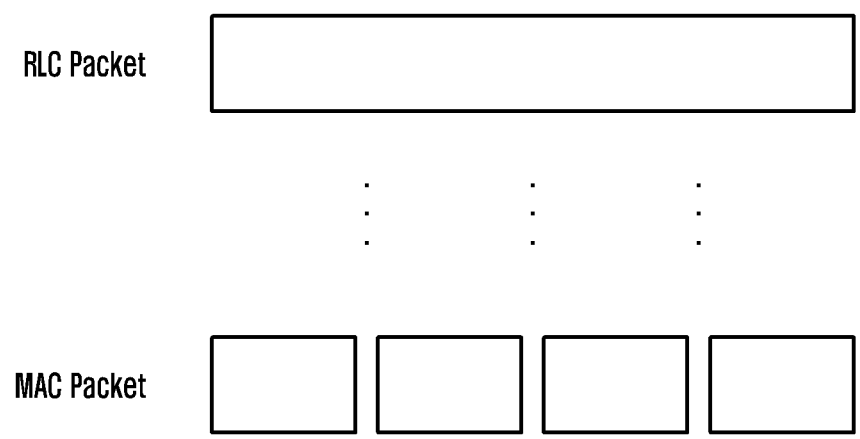

FIGS. 6A and 6B are diagrams illustrating a method for segmenting, by a terminal, an RLC packet into an MAC packet according to various embodiments of the present disclosure.

FIG. 6A illustrates a process of segmenting, by a terminal, one RLC packet into two MAC packets. Generally, if one RLC packet at the RLC layer is segmented into two MAC packets, in an embodiment of the present disclosure, a method for segmenting one RLC packet into four MAC packets is proposed as illustrated in FIG. 6B.

As such, if the number of RBs for transmitting a packet is reduced, an output of the terminal consumed per the RB is increased. Further, if the MCS is reduced, a packet error rate is reduced, such that the reliability of communication may be increased.

The foregoing contents will be described in more detail as an example.

It may be assumed that the VoLTE packet is input at VoLTE codec 12.2 kbps every 20 ms. In this case, when robust header compression (RoHC) is not applied, a TBS of about 78 bytes is provided. In this case, a signal may be transmitted using 3 RBs and MCS 12. In connection with this, when the VoLTE packet is segmented into two according to an embodiment of the present disclosure, 3 RBs and MCS 7 are each used to transmit the segmented packet. That is, when the same RB is used, the MCS level may be reduced and as a result the reliability of communication may be increased.

Further, in the example, when the VoLTE packet is segmented into two and when MCS 12 is used, 2 RBs are used. That is, when the same MCS level is used, the used number of RBs may be reduced and therefore the output consumed per RB may be increased. As a result, the reliability of communication may be increased.

As a second method for increasing coverage, the method for increasing an HARQ retransmission frequency will be described.

The base station may transmit the control message to the terminal to set the HARQ retransmission frequency as a maximum value. Therefore, when the terminal fails to transmit the uplink data, the base station may increase a retransmission frequency of the uplink data. Here, the control message may be a radio resource control (RRC) message or upper layer signaling. The HARQ retransmission frequency may be controlled in setting of radioResourceConfigDedicated>MAC-MainConfig>ul-SCH-Config>maxHARQ-Tx on the LTE standard. In more detail, the setting is shown in the following Table 1.

TABLE 1

MAC-MainConfig information element
-- ASN1START
MAC-MainConfig ::=           SEQUENCE {
    ul-SCH-Config            SEQUENCE {
        maxHARQ-Tx TABLE 1-continued

```
ENUMERATED {
n1, n2, n3, n4, n5, n6, n7, n8,
n10, n12, n16, n20, n24, n28,
spare2, spare1}        OPTIONAL, -- Need ON
         periodicBSR-Timer                ENUMERATED {
sf5, sf10, sf16, sf20, sf32, sf40, sf64, sf80,
sf128, sf160, sf320, sf640, sf1280, sf2560,
infinity, spare1}    OPTIONAL, -- Need ON
         retxBSR-Timer
ENUMERATED {
sf320, sf640, sf1280, sf2560, sf5120,
sf10240, spare2, spare1},
         ttiBundling                      BOOLEAN
}
                       OPTIONAL, -- Need ON
```

As a third method for increasing coverage, the frequency hopping method will be described.

The base station may transmit the control message to the terminal to instruct the frequency hopping to be performed upon the transmission of the uplink data. As a result, the base station may obtain a frequency diversity gain using the frequency hopping when receiving the uplink data of the terminal. Here, the control message may be the RRC message or the upper layer signaling. The frequency hopping may be controlled in setting of physical uplink shared channel (PUSCH)-Config>PUSCH-ConfigCommon>pusch-ConfigBasic>hoppingMode on the LTE standard. In more detail, the setting is shown in the following Table 2.

TABLE 2

```
PUSCH-Config information element
-- ASN1START
PUSCH-ConfigCommon ::=        SEQUENCE {
     pusch-ConfigBasic        SEQUENCE {
         n-SB                 INTEGER
(1..4),
         hoppingMode
     ENUMERATED {interSubFrame, intraAndInterSubFrame},
         pusch-HoppingOffset  INTEGER
(0..98),
         enable64QAM
     BOOLEAN
     },
     ul-ReferenceSignalsPUSCH  UL-
ReferenceSignalsPUSCH
```

As a fourth method for increasing coverage, the TTI bundling method will be described.

The base station may transmit the control message to the terminal to instruct the terminal to perform the TTI bundling. The TTI bundling is a method that includes the same information but continuously transmits packets in which a redundancy version is differently set. For this purpose, the same packets are continuously transmitted, and as a result the data modulation and decoding success rate may be increased. The TTI bundling may be controlled in setting of radioResourceConfigDedicated>MAC-MainConfig>ul-SCH-Config>ttiBundling on the LTE standard. In more detail, the setting is shown in the following Table 3.

TABLE 3

```
MAC-MainConfig information element
-- ASN1START
MAC-MainConfig ::=              SEQUENCE {
     ul-SCH-Config              SEQUENCE {
         maxHARQ-Tx
```

TABLE 3-continued

```
ENUMERATED {
n1, n2, n3, n4, n5, n6, n7, n8,
n10, n12, n16, n20, n24, n28,
spare2, spare1}        OPTIONAL, -- Need ON
         periodicBSR-Timer                ENUMERATED {
sf5, sf10, sf16, sf20, sf32, sf40, sf64, sf80,
sf128, sf160, sf320, sf640, sf1280, sf2560,
infinity, spare1}   OPTIONAL, -- Need ON
         retxBSR-Timer
ENUMERATED {
sf320, sf640, sf1280, sf2560, sf5120,
sf10240, spare2, spare1},
         ttiBundling                      BOOLEAN
}
                       OPTIONAL, -- Need ON
```

When the TTI bundling is performed, a signal is transmitted throughout several TTIs at the RB of the same location. In this case, channel estimation may be precisely performed by using an appropriate channel estimation method depending on whether the wireless channel environment is a frequency selective fading environment, a plane fading environment, or an environment in which a user terminal moves at a high speed or a low speed, thereby obtaining an additional gain. In this case, as the channel estimation method, a time-domain filtering method, etc. may be used.

As a fifth method for increasing coverage, the method for performing hopping in a bundle unit upon HARQ retransmission will be described. If scheduling within a time interval where the bundling is performed upon the application of the TTI bundling is allocated at the same RB location, the frequency hopping effect for the bundling resources may not be obtained, but the channel estimation gain for the corresponding bundled resource may be obtained.

Further, when the corresponding TTI bundling resource is retransmitted, the RB within the bundling is scheduled while being fixed at the same location and the retransmitted bundling unit changes the RB to obtain the frequency hopping gain, thereby obtaining the hopping effect. By doing so, the channel estimation gain and the frequency hopping gain both may be obtained.

As a sixth method for increasing coverage, the method for using a resource coordinator will be described.

Figure 9:
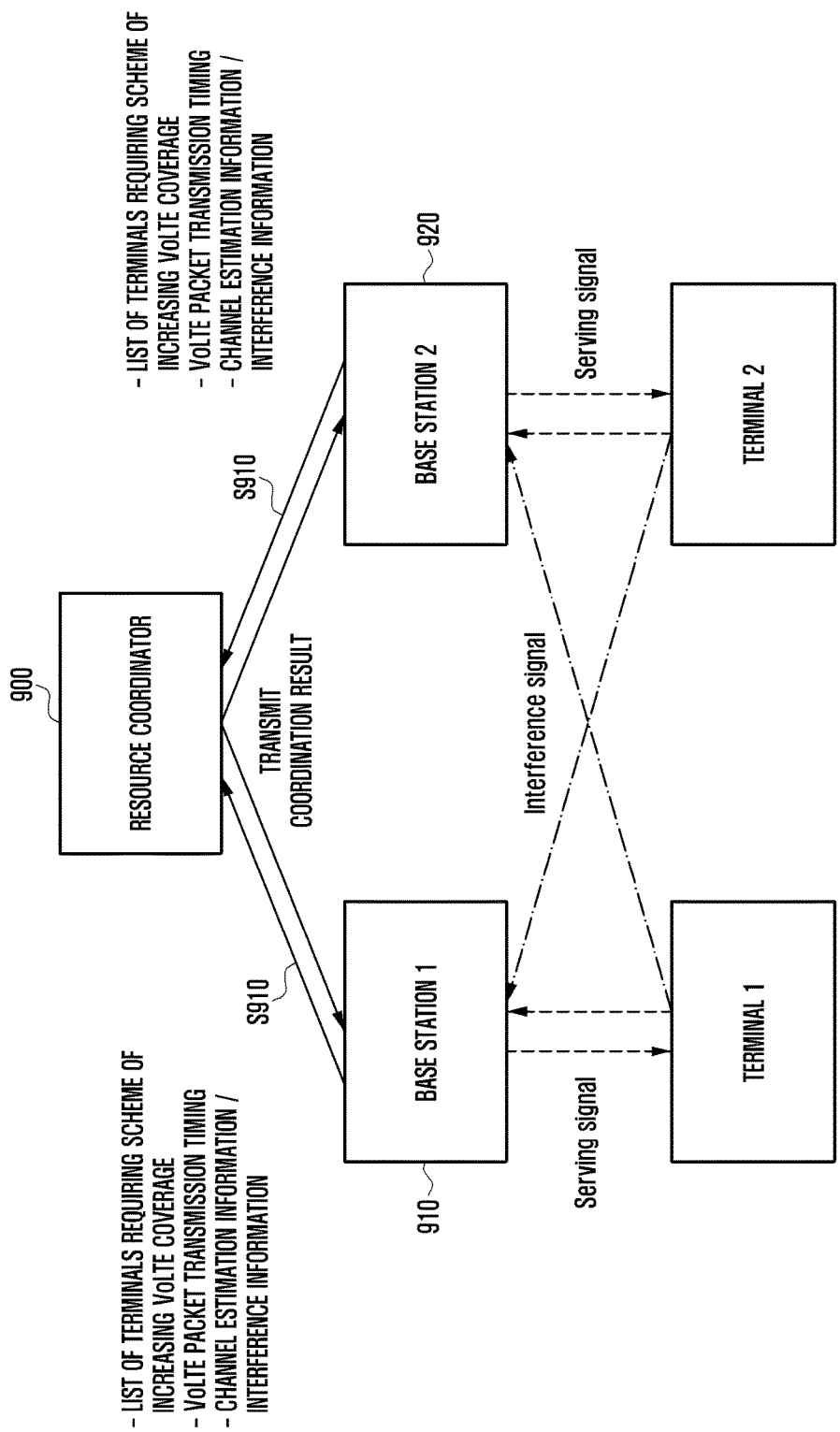
FIG. 9 is a diagram illustrating a method for improving an uplink coverage using a resource coordinator according to an embodiment of the present disclosure.

FIG. 9 is a diagram illustrating a method for improving an uplink coverage using a resource coordinator according to an embodiment of the present disclosure.

Referring to FIG. 9, when there is an uplink scheduling resource coordinator 900, the resource coordinator 900 receives a list of terminals requiring a scheme of increasing a VoLTE coverage from a base station 1 910, a base station 2 920, etc., information on VoLTE packet transmission timing, channel estimation information, interference information, etc.

The resource coordinator 900 may generate coordination information based on the information to avoid the inter-cell interference at the timing when the uplink VoLTE packet transmission is required.

For example, a frequency band is divided into A and B, in which the A is allocated to the terminal requiring the scheme of increasing a VoLTE coverage at a cell edge of the base station 1 910 and the B is allocated to the terminal requiring the scheme of increasing a VoLTE coverage at a cell edge of the base station 2 920. Further, the frequency band B is allocated to a terminal at a center of the base station 1 910, and thus the interference to the base station 2 920 becomes small.

Similarly, the frequency band A is allocated to a terminal at a center of the base station 2 920, and thus the interference to the base station 1 910 becomes small.

Further, when there is a message transmission delay between the resource coordinator 900 and the base station, the continuous coordination at a time interval and the coordination result considering the retransmission may be generated even for the terminal in which the bundling is used or the retransmission is expected.

The information transmitted from the resource coordinator 900 to the base station may represent whether the specific base station uses a resource for extending the uplink coverage at a specific time in a bitmap form. The coordinated information is transferred to each base station and thus each base station may schedule the terminals of which the uplink coverage needs to be extended in the frequency band without interference.

Meanwhile, when the base station proceeds to operation S230 of FIG. 2 and thus does not require the coverage control, the application of the coverage control to the terminals set by the coverage control may be released.

The following conditions are examples of a condition in which the base station determines that the application of the coverage control to the terminals set by the coverage control is released.

First, when the TBS transmittable to the uplink by the terminal is larger than the preset first reference value, the base station may release the application of the coverage control to the corresponding terminal. This may be represented by the following Equation 3.

$$TBSi \geq TBS_{setupthreshold} \qquad \text{Equation 3}$$

In the above Equation 3, the TBSi may be a TBS transmittable to the uplink by a terminal i.

Further, the base station may release the application of the coverage control only to the terminals in which the radio bearer for the VoLTE transmission set for the terminal is released.

Next, the base station proceeds to operation S240 and thus the base station may change parameters set in the terminal to release the application of the coverage control. For example, the base station may set radioResourceConfigDedicated>MAC-MainConfig>ul-SCH-Config>maxHARQ-Tx on the foregoing LTE standard as the normal operation value. Further, the base station may set PUSCH-Config>PUSCH-ConfigCommon>pusch-ConfigBasic>hoppingMode as the normal operation value.

Figure 3:
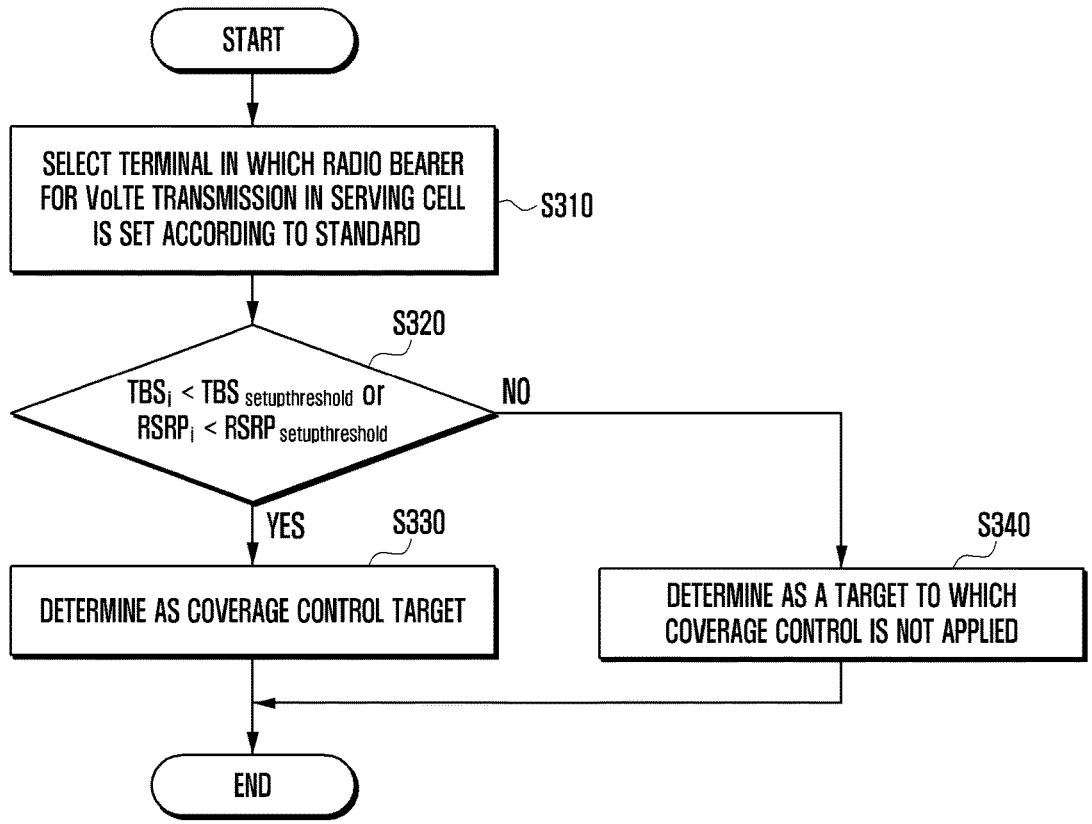
FIG. 3 is a flowchart illustrating a process of determining, by a base station, a terminal for applying a scheme for increasing coverage according to an embodiment of the present disclosure.

FIG. 3 is a flowchart illustrating a process of determining, by a base station, a terminal for applying a scheme for increasing coverage according to an embodiment of the present disclosure.

FIG. 3 may illustrate, in more detail, operation S210 of FIG. 2.

Referring to FIG. 3, the base station confirms the terminal in which the radio bearer for the VoLTE transmission is set within the serving cell operated by the base station in operation S310.

In operation S320, the base station may confirm the terminal in which the TBS transmittable to the uplink by the terminal is smaller than the first reference value TBS_$_{setupthreshold}$. Alternatively, in operation S320, the base station may confirm the terminal in which the RSRP for the serving cell included in the measurement report received from the terminal is smaller than the preset second reference value RSRP_$_{setupthreshold}$.

The base station proceeds to operation S330 to be able to determine terminals that meet at least one of the conditions as a target terminal for applying the scheme of increasing coverage according to an embodiment of the present disclosure.

On the other hand, the base station proceeds to operation S340 to be able to determine terminals that do not meet any of the conditions as the terminal to which the scheme of increasing coverage is not applied.

Figure 4:
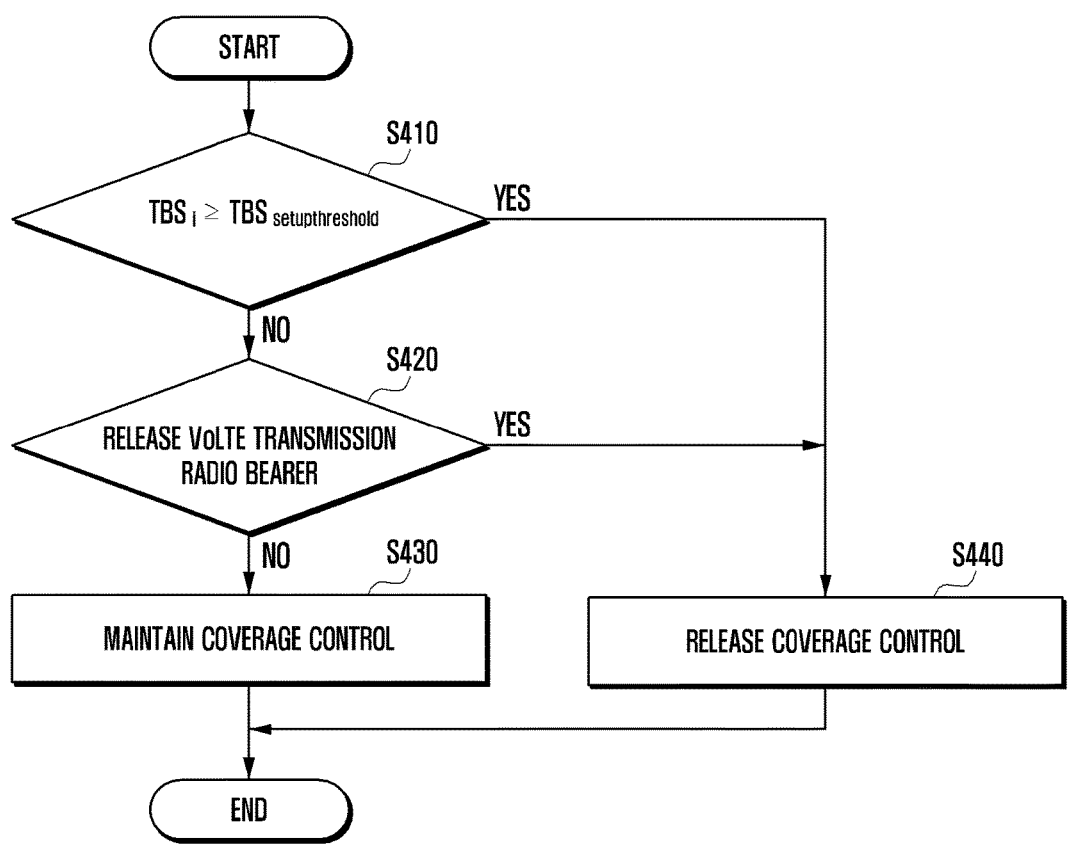
FIG. 4 is a flowchart illustrating a process of determining, by a base station, a terminal for releasing the scheme for increasing a coverage according to an embodiment of the present disclosure.

FIG. 4 is a flowchart illustrating a process of determining, by a base station, a terminal for releasing the scheme for increasing a coverage according to an embodiment of the present disclosure.

First, the base station determines if it is able to maintain the application of the scheme of increasing coverage to the terminals in which the TBS transmittable to the uplink by the terminal is smaller than the preset first reference value TBS_$_{setupthreshold}$ and the radio bearer for the VoLTE transmission is continuously set, in operations S410 and S420. If so, the base station proceeds to operation S430 to maintain the application of the scheme of increasing coverage to the terminals.

On the other hand, the base station proceeds to operation S440 to be able to release the application of the scheme of increasing coverage to the terminal if it is determined that the TBS transmittable to the uplink by the terminal is larger than or equal to the preset first reference value TBS_$_{setupthreshold}$ in operation S410.

Further, the base station proceeds to operation S440 to be able to release the application of the scheme of increasing coverage even to the terminal in which the radio bearer for the VoLTE transmission is released, even though the TBS transmittable to the uplink by the terminal is smaller than the preset first reference value TBS_$_{setupthreshold}$ in operation S420.

Figure 5:
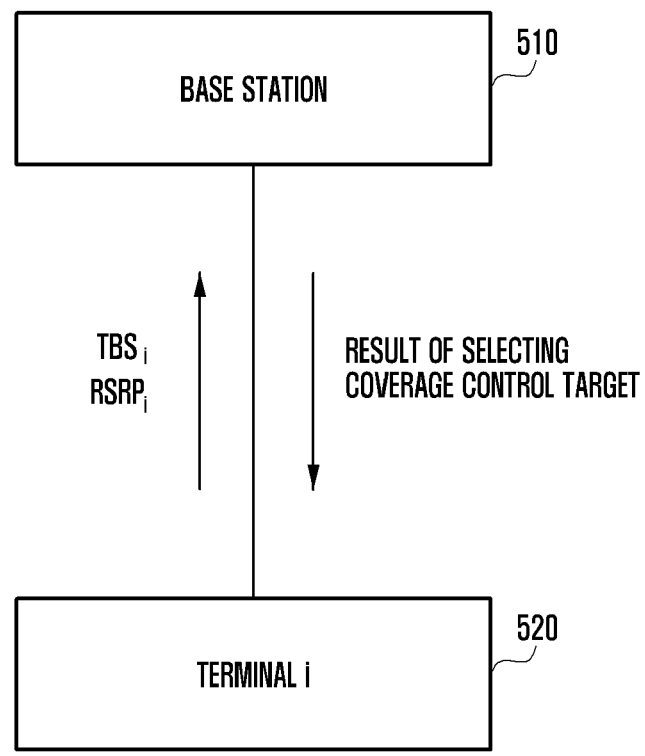
FIG. 5 is a diagram illustrating a process of exchanging, by a base station, information between the base station and a terminal to select a terminal of which the coverage needs to be increased according to an embodiment of the present disclosure.

FIG. 5 is a diagram illustrating a process of exchanging, by a base station, information between the base station and a terminal to select a terminal of which the coverage needs to be increased according to an embodiment of the present disclosure.

Referring to FIG. 5, the terminal may transmit the information on the TBS transmittable to the uplink to the base station in operation S510. Further, in operation S510, the terminal may transmit the RSRP information on the serving cell to the base station. The RSRP information on the serving cell may be included in the measurement report transmitted to the base station by the terminal.

In operation S520, the base station may inform whether the terminal is determined as the terminal to which the coverage control is applied to the terminal.

Figure 7:
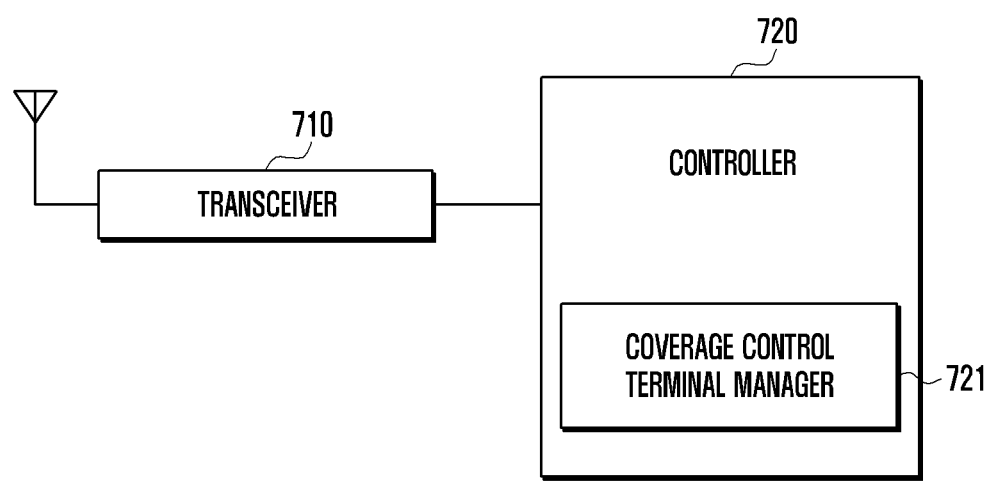
FIG. 7 is a block diagram illustrating an internal structure of a base station according to an embodiment of the present disclosure.

FIG. 7 is a block diagram illustrating an internal structure of a base station according to an embodiment of the present disclosure.

Referring to FIG. 7, the base station may include a transceiver 710 and a controller 720.

The transceiver 710 transmits and receives a signal to and from the terminal. The signal may include control information for scheduling the terminal and data. The transceiver 710 may also transmit and receive a signal to the terminal and entities located at a core network, for example, a gateway, mobility management entities.

The controller 720 may control the base station to perform a series of operations for controlling the coverage of the terminal. For this purpose, the controller 720 may further include a coverage control terminal manager 721.

In more detail, the coverage control terminal manager 721 may confirm terminals within a service radius of the base station and having the radio bearer for the VoLTE transmission set therein. Further, the coverage control terminal manager 721 may confirm that the terminal is the terminal in which the transport block size transmittable to the uplink is smaller than the preset first reference value, among the confirmed terminals. The coverage control terminal manager 721 may determine the confirmed terminal as the coverage control target terminal.

Further, the coverage control terminal manager 721 may confirm the terminal in which the reference signal received intensity for the serving cell included in the measurement report message is smaller than a preset second reference value, among the terminals within the service radius of the base station and having the radio bearer for the VoLTE transmission set therein. Further, the coverage control terminal manager 721 may determine the confirmed terminal as the coverage control target terminal.

Further, the coverage control terminal manager 721 may also determine the terminals meeting all the above-mentioned conditions as the coverage control target terminal.

The controller 720 may control the coverage control target terminal to segment the RLC packet into the preset number of MAC packets.

Further, the controller 720 may perform a control to transmit the control message for increasing the HARQ retransmission frequency of the coverage control target terminal.

Further, the controller 720 may perform a control to transmit the control message for performing the frequency hopping of the coverage control target terminal upon the transmission of the uplink data.

Further, the controller 720 may perform a control to transmit the control message for performing the TTI bundling of the coverage control target terminal.

Further, the controller 720 may perform a control to release the setting of the radio bearer for the VoLTE transmission or release the coverage control for the terminal in which the reference signal received intensity for the serving cell included in the measurement report message is larger than the preset second reference value.

The foregoing description describes that the controller 720 includes the coverage control terminal manager 721 and the functions performed by each unit are different, but is not necessarily limited thereto. For example, it is to be noted that the controller 720 itself may also perform the functions performed by the coverage control terminal manager 721.

Figure 8:
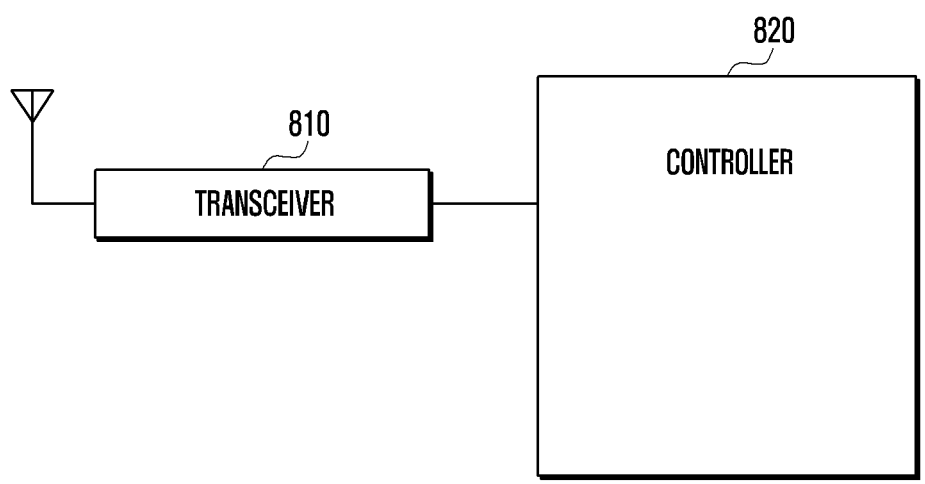
FIG. 8 is a block diagram illustrating an internal structure of a terminal according to an embodiment of the present disclosure.

FIG. 8 is a block diagram illustrating an internal structure of a terminal according to an embodiment of the present disclosure.

Referring to FIG. 8, the terminal according to the embodiment of the present disclosure may include a transceiver 810 and a controller 820.

The transceiver 810 may transmit and receive a signal to and from the base station. The transceiver 810 performs the transmitting and receiving function of the corresponding data for wireless communication of the terminal. The transceiver 810 may include a radio frequency (RF) transmitter that up-converts and amplifies a frequency of the transmitted signal and an RF receiver that low-noise-amplifies the received signal and down-converts the frequency. Further, the transmitter 810 may receive data through the radio channel and output the received data to the controller 820 and transmit the data output from the controller 820 through the radio channel.

The controller 820 may control the terminal to perform a series of processes for increasing coverage based on the control of the base station.

The controller 820 may perform a control to transmit the information on the TBS transmittable to the uplink to the base station. Further, the controller 820 may perform a control to transmit the RSRP information on the serving cell to the base station. The RSRP information on the serving cell may be included in the measurement report transmitted to the base station by the terminal.

The base station may use the TBS or the RSRP information transmitted to the base station to perform the coverage control of the terminal.

Further, the controller 820 may receive the control message for the coverage control that is transmitted by the base station and perform the command included in the received control message. For example, the controller 820 may perform a control to perform the operations such as the RLC segmentation, the increase in HARQ maximum retransmission frequency, the frequency hopping, and the TTI bundling depending on the contents of the control message received from the base station.

An embodiment of the present disclosure proposes a standard for selecting a terminal of which the uplink coverage needs to be controlled among the terminals present at various locations within a cell operated by a base station. As a result, the terminal having the increased uplink coverage may improve the use efficiency of power and increase the reliability of uplink transmission.

Embodiments of the present disclosure propose a standard for selecting a user terminal of which the uplink coverage needs to be increased among the user terminals present at various locations within the cell operated by the base station. As a result, the terminal having the increased uplink coverage may improve the use efficiency of power and increase the reliability of uplink transmission.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a base station in a wireless communication system, the method comprising:
   determining a terminal for a coverage control among a plurality of terminals within a service radius of the base station based on information of a radio bearer configured for each of the plurality of terminals; and
   transmitting, to the terminal for the coverage control, a message to increase a coverage of the terminal.

2. The method of claim 1, wherein the determining of the terminal comprises:
   identifying a terminal in which a configured uplink transport block size is smaller than a preset first reference value and having a radio bearer with an identifier for a voice over long term evolution (VoLTE) transmission; and
   determining the identified terminal as the terminal for the coverage control.

3. The method of claim 1, wherein the determining of the terminal comprises:
   identifying a terminal in which a reference signal received power (RSRP) for a serving cell included in a measurement report message is smaller than a preset second reference value and having a radio bearer with an identifier for a VoLTE transmission; and
   determining the identified terminal as the terminal for the coverage control.

4. The method of claim 1, wherein the message notifies the terminal to segment a radio link control (RLC) packet into a preset number of medium access control (MAC) packets.

5. The method of claim 1, wherein the message notifies the terminal to increase a number of hybrid automatic repeat request (HARQ) retransmission of the terminal.

6. The method of claim 1, wherein the message notifies the terminal to perform a frequency hopping when transmitting an uplink data.

7. The method of claim 1, wherein the message notifies the terminal to perform a transmission time interval (TTI) bundling.

8. The method of claim 1, further comprising:
releasing the coverage control for the terminal, when a configuration of a radio bearer for a VoLTE transmission is released for the terminal or when a RSRP for a serving cell included in a measurement report message received from the terminal is larger than a preset second reference value.

9. The method of claim 1, wherein the message includes scheduling information generated by a resource coordinator.

10. A base station in a wireless communication system, the base station comprising:
a transceiver configured to transmit and receive a signal; and
a controller coupled with the transceiver and configured to:
determine a terminal for a coverage control among a plurality of terminals in a service radius of the base station based on information of a radio bearer configured for each of the plurality of terminals, and
transmit, to the terminal for the coverage control, a message to increase a coverage of the terminal.

11. The base station of claim 10, wherein the controller is further configured to:
identify a terminal in which a configured uplink transport block size is smaller than a preset first reference value and having a radio bearer with an identifier for a voice over long term evolution (VoLTE) transmission, and
determine the identified terminal as the terminal for the coverage control.

12. The base station of claim 10, wherein the controller is further configured to:
identify a terminal in which a reference signal received power (RSRP) for a serving cell included in a measurement report message is smaller than a preset second reference value and having a radio bearer with an identifier for a VoLTE transmission, and
determine the identified terminal as the terminal for the coverage control.

13. The base station of claim 10, wherein the message notifies the terminal to segment a radio link control (RLC) packet into a preset number of medium access control (MAC) packets.

14. The base station of claim 10, wherein the message notifies the terminal to increase a number of hybrid automatic repeat request (HARQ) retransmission of the terminal.

15. The base station of claim 10, wherein the message notifies the terminal to perform a frequency hopping when transmitting an uplink data.

16. The base station of claim 10, wherein the message notifies the terminal to perform a transmission time interval (TTI) bundling.

17. The base station of claim 10, wherein the controller is further configured to release the coverage control for the terminal, when a configuration of a radio bearer for a VoLTE transmission is released for the terminal or when a RSRP for a serving cell included in a measurement report message received from the terminal is larger than a preset second reference value.

18. The base station of claim 10, wherein the message includes scheduling information generated by a resource coordinator.

* * * * *